United States Patent Office 3,024,292
Patented Mar. 6, 1962

3,024,292
PRODUCTION OF CONJUGATED DIOLEFINES
John Habeshaw, Dollar, Wilfred John Oldham, Grangemouth, and Max Marin Wirth, Dollar, Scotland, assignors to British Hydrocarbon Chemicals Limited, Devonshire House, Mayfair Place, Piccadilly, London, England, a British company
No Drawing. Filed Apr. 24, 1959, Ser. No. 808,558
Claims priority, application Great Britain May 7, 1958
5 Claims. (Cl. 260—681)

The present invention relates to the production of conjugated diolefines by the reaction of aldehydes with mono-olefines.

The condensation of olefines with aldehydes is sometimes called the Prins reaction. Such condensation reactions are capable of yielding a variety of products such as m-dioxanes, unsaturated alcohols, 1:3 diols or conjugated diolefines depending on the reaction conditions employed. The production of conjugated diolefines by the reaction between mono-olefines and aldehydes has been carried out by means of a two-stage process, and by a one-stage vapour phase process. A variety of catalysts has been proposed for use in the one-stage reaction of which the best has appeared to be activated alumina. However, the yields of diolefine and efficiency of conversion of the starting materials have been low, owing apparently to the tendency of the diolefine to react with the aldehyde forming higher boiling condensation products, and also because of the decomposition of formaldehyde to give products such as carbon monoxide, so that the process has not represented an economic proposition on the industrial scale.

It is an object of the present application to provide a process for the production of conjugated diolefines by the condensation of aldehydes and olefines in a single stage reaction in which improved yields and efficiencies are obtained.

According to the present invention, the process for the production of conjugated diolefines comprises reacting a lower mono-olefine with formaldehyde or acetaldehyde at an elevated temperature in the vapour phase in the presence as catalyst of a volatile acid, or a compound which gives rise to such an acid under the reaction conditions, and a solid contact material.

As illustrative of the volatile acid catalysts which may be used in the process of the present invention may be mentioned volatile mineral acids such as hydrogen chloride, hydrogen iodide, and hydrogen bromide, and organic acids such as formic, acetic, chloroacetic, trichloroacetic and trifluoroacetic acids. It is preferred to use hydrogen chloride. Compounds giving rise under the reaction conditions to volatile acids may also be used. Such compounds include alkyl and ammonium halides such as ammonium chloride, sec-butyl bromide, or preferably tert-butyl chloride.

Any suitable solid contact material may be used in conjunction with the acid, such as silica gel, alumina, kieselguhr and pumice. The preferred solid contact material is silica gel, which may, if desired, be treated with small amounts of a salt of a metal from group 2A or 2B of the periodic table, such as calcium, barium, or cadmium.

The olefines which are suitable for use in the process of the present invention are the lower mono-olefines having up to six carbon atoms, and particularly the tertiary olefines, i.e. olefines of the general formula $R_1R_2C=CHR_3$ where $R_1$ and $R_2$ are lower alkyl radicals, and $R_3$ is hydrogen or a lower alkyl radical. Olefines which isomerise under the reaction conditions to give tertiary olefines of the type $R_1R_2C=CHR_3$ may also be used. It is particularly preferred to use isobutene, 2-methylbutene-2 and 2-methylbutene-1. The molar proportion of olefine is preferably at least equal to that of the aldehyde used, and is suitably between 1 and 20 moles per mole of aldehyde.

The aldehydes which can be used in the process of the present invention are formaldehyde and acetaldehyde. The use of formaldehyde is preferred. Advantageously the formaldehyde is derived from industrial formalin which is a solution of 36 to 40% by weight of formaldehyde in water, usually containing some methanol. The formalin may be diluted with additional water if desired. Suitably, the volatile acid catalyst is combined with the formalin and the mixture is then vaporized and mixed with the lower mono-olefine before passing over the contact material, and the steam in the gas mixture acts as a diluent. If desired inert diluents may be used, such as nitrogen, carbon dioxide or hydrocarbons such as the lower paraffins. The proportion of inert diluent in the reaction gas mixture can vary widely, for instance between 0% and about 95% by volume.

In a particularly preferred embodiment of the process of the present invention a mixture of lower mono-olefine with formaldehyde or acetaldehyde, and containing a proportion of hydrogen chloride, is continuously contacted at an elevated temperature in the vapour phase with silica gel. The proportion of hydrogen chloride fed may vary between moderately wide limits for instance between 0.01 and 10% by weight of the olefinic starting material.

The process of the present invention has the advantage that the usual initial period of catalyst inefficiency does not occur, or is very greatly reduced. The process also produces a diolefine product of appreciably higher purity than has been obtained in the processes used hitherto. In particular, isoprene is made containing much less methylbutenes, which are difficult and expensive to separate from isoprene. The length of life of the solid contact material before regeneration is required is also greater than with many other solid catalysts.

The reaction may be carried out over a wide range of temperatures, for instance between 100° and 400° C. The space velocity of the reactants over the solid contact material may likewise vary and is suitably between 0.1 and 50 expressed as moles of aldehyde per litre of contact material per hour. The optimum velocity will vary depending on the reaction temperature, and it is preferred to use the higher values of space velocities in the range set out with the higher temperatures, and vice versa.

For the process according to the invention the known methods of vapour phase catalysis may be employed. The solid contact material may be a stationary or moving bed or a fluidized bed method may be used.

The diolefines can be recovered from the gaseous reaction product in any suitable manner, for instance by condensing the product followed by fractional distillation of the resulting liquid mixture. Unreacted olefines and formaldehyde can be recycled to the catalytic reaction.

A variety of conjugated diolefines can be produced by the process of the invention, including isoprene, from isobutene and formaldehyde.

The diolefines made in accordance with this invention are valuable chemical intermediates, for instance in the preparation of synthetic rubbers.

The process of the invention is further illustrated with reference to the following examples.

*Example 1*

A mixture of formaldehyde, steam and hydrogen chloride, derived from aqueous 18% formalin containing 2% by weight of hydrogen chloride, and isobutene was passed in the vapour phase over silica gel of 83 A. average pore diameter at atmospheric pressure and at a temperature of 300° C., the reaction products being condensed and fractionally distilled to recover the isoprene. Two processes were carried out, the reaction conditions and results over the first 4 hours being shown in Table 1, Runs A and B. The exceptional purity of the isoprene, which contained much reduced amounts of methylbutenes compared with, for example, cracking catalysts, is noteworthy.

By way of comparison with the above example the process was repeated except that the hydrogen chloride was omitted from the formalin feed (Run C). No formation of isoprene took place. Similarly, when the process was carried out in the presence of hydrogen chloride, but in the absence of silica gel, by passing the reactants through an empty tube (Run D), no isoprene was formed.

TABLE 1

| Run No. | A | | B | | C | D |
|---|---|---|---|---|---|---|
| Catylyst | Silica gel/HCl | | Silica gel/HCl | | Silica gel [2] | HCl [2] |
| | (1) | (2) | (1) | (2) | | |
| Space velocity, moles total feed/litre silica gel/hour | 36 | 37 | 150 | 141 | 38 | 12 |
| Mole ratio, isobutene/formaldehyde | 3.7 | 3.4 | 3.5 | 3.8 | 4.2 | 4.8 |
| Formaldehyde conversion, percent | 69 | 70 | 40 | 48 | 1 | 12 |
| Efficiency of isoprene formation, based on formaldehyde consumed, percent | 45 | 41 | 36 | 40 | | |
| Isoprene formation rate, g./litre silica gel/hour | 63 | 61 | 127 | 152 | Nil | Nil |
| Methylbutenes content of isoprene, weight percent | | 1.0 | | 0.3 | | |

[1] Results based on product from fourth hour of operation only.
[2] Results based on total product from first four hour operation.

*Example 2*

A mixture of formaldehyde and steam derived from aqueous 18% formalin and isobutene containing 2 mol percent of butyl halide was passed in the vapour phase over silica gel of 83 A. average pore diameter at atmospheric pressure and at a temperature of 300° C., the reaction products being condensed and fractionally distilled to recover isoprene. Two runs were carried out, one using tert.-butyl chloride and one using sec.-butyl bromide, the reaction conditions and results being shown in Table 2, Runs A and B. The purity of the isoprene produced which contained only very small amounts of methylbutenes, is noteworthy. The product contained less than 1% of alkyl halide based on the isoprene produced.

TABLE 2

| Run No. | A | | B |
|---|---|---|---|
| Catalyst | Silica gel/tert. butyl chloride | | Silica gel/sec. butyl bromide[3] |
| | (1) | (2) | |
| Space velocity, moles total feed/litre silica gel/hour | 76 | 74 | 75 |
| Mole ratio, isobutene/formaldehyde | 4.4 | 4.1 | 4.1 |
| Formaldehyde conversion, percent | 50 | 37 | 35 |
| Efficiency of isoprene formation based on formaldehyde consumed, percent | 54 | 49 | 46 |
| Isoprene formation rate, g./litre silica gel/hour | 108 | 74 | 65 |
| Methylbutenes content of isoprene, weight percent | | 0.4 | 1.0 |

[1] 4th hour.
[2] Total first four hours.
[3] Total first three hours.

*Example 3*

A mixture of formaldehyde, steam and ammonium chloride fed in the form of aqueous 18% formalin, containing one percent by weight of ammonium chloride, and isobutene was reacted in the vapour phase as in Example 2, the reaction conditions and results being shown in Table 3.

TABLE 3

| Catalyst | Silica gel/NH$_4$Cl | |
|---|---|---|
| | (1) | (2) |
| Space velocity, moles total feed/litre silica gel/hour | 56 | 61 |
| Mole ratio, isobutene/formaldehyde | 6.1 | 5.3 |
| Formaldehyde conversion, percent | 17 | 29 |
| Efficiency of isoprene formation based on formaldehyde consumed, percent | 20 | 40 |
| Isoprene formation rate, g./litre silica gel/hour | 10 | 35 |
| Methylbutenes content of isoprene, weight percent | | 0.5 |

[1] 4th hour.
[2] Total first 4 hours.

*Example 4*

In this example trichloracetic acid was substituted in equimolar amounts for the hydrogen chloride used in Examples 1A and 1B. The conditions and main results are set out in Table 4, column (1) referring to the results from the fourth hour of operation and column (2) to results from the total first four hours.

TABLE 4

| | 1 | 2 |
|---|---|---|
| Space velocity, moles total feed/litre silica gel/hour | 73 | 74 |
| Mole ratio isobutene/formaldehyde in the feed | 3.8 | 4.0 |
| Formaldehyde conversion, percent | 29 | 44 |
| Efficiency of isoprene formation, based on formaldehyde reacted, percent | 65 | 43 |
| Isoprene formation rate, g./litre silica gel/hour | 77 | 77 |
| Methylbutenes content of isoprene | | 0.2 |

*Example 5*

A series of processes were carried out under the conditions given in Example 1A. After four hours on stream the silica-gel carrier was regenerated by burning off carbon in a stream of air at 500° C. for 1 hour. The run was then resumed for a further four hours and the regeneration repeated. Results for successive four hour periods obtained in this way are summarized in Table 5.

TABLE 5

| Number of regenerations | Fresh | 1 | 2 | 3 |
|---|---|---|---|---|
| Space velocity, moles/litre/hour | 37 | 35 | 35 | 37 |
| Mole ratio isobutene/formaldehyde | 3.4 | 3.4 | 3.0 | 4.1 |
| Formaldehyde conversion, percent | 70 | 66 | 52 | 47 |
| Efficiency of isoprene formation based on formaldehyde reacted, percent | 41 | 44 | 37 | 49 |
| Isoprene formation rate g./litre/hour | 61 | 60 | 41 | 45 |
| Methylbutenes content of isoprene product, percent | 1.0 | 1.1 | 0.9 | 1.3 |

*Example 6*

A series of processes were carried out under the conditions of Example 1A, using silica gel samples of differing physical characteristics. Results are summarized in Table 6, which includes for comparison results under corresponding conditions with pelleted diatomaceous earth and a commercial silica/alumina catalyst which had been heat treated for 1 hour at 850° C. in the presence of steam. All the results reported refer to the total of four hours operation with the catalyst.

TABLE 6

| Catalyst carrier | Silica gel | | | | | | | Diat. earth | Silica-alumina |
|---|---|---|---|---|---|---|---|---|---|
| Surface area, sq. metres/g | 330 | 626 | 655 | 465 | 282 | 207 | 189 | 30 | 114 |
| Average pore diameter A | 83 | 22 | 36 | 55 | 111 | 109 | 140 | —— | 88 |
| Space velocity, moles/litre/hour | 68 | 76 | 72 | 79 | 74 | 72 | 73 | 38 | 65 |
| Mole ratio isobutene/formaldehyde | 3.6 | 3.6 | 3.8 | 4.2 | 3.7 | 4.0 | 3.9 | 3.2 | 3.9 |
| Formaldehyde conversion, percent | 60 | 39 | 37 | 48 | 41 | 29 | 23 | 18 | 58 |
| Isoprene formation efficiency, percent (based on formaldehyde reacted) | 50 | 48 | 45 | 61 | 59 | 62 | 41 | 15 | 42 |
| Isoprene formation rate g./litre/hour | 114 | 76 | 69 | 126 | 100 | 71 | 38 | 6 | 86 |
| Methylbutenes content of isoprene, percent | 0.5 | 1.3 | 0.4 | 0.4 | 0.1 | 0.1 | <0.1 | 0.4 | 3.2 |

Example 7

A series of processes were carried out in which 25 milligram atoms of a group 2A or 2B metal were added as an aqueous solution of the chlorides to the silica gel (40 g.) used as carrier in the reaction. The products were then dried at 100–120° C. for 1 hour and used as catalysts for the reaction at 300° C. and atmospheric pressure, the formaldehyde and hydrogen chloride being fed as an aqueous solution containing 18% formaldehyde and 2% of HCl. Other conditions and results are summarized in Table 7, results with an untreated silica gel being included for comparison. All results are for four hour periods starting with the fresh catalyst.

TABLE 7

| Metal salt added | None | Calcium | Cadmium | Barium |
|---|---|---|---|---|
| Space velocity, moles/litre/hour | 76 | 72 | 73 | 71 |
| Molar ratio isobutene/formaldehyde | 4.1 | 4.5 | 4.6 | 4.5 |
| Formaldehyde conversion, percent | 62 | 65 | 74 | 67 |
| Isoprene formation efficiency, percent (based on formaldehyde reacted) | 52 | 62 | 58 | 56 |
| Isoprene formation rate g./litre/hour | 131 | 152 | 162 | 140 |
| Methylbutenes content of isoprene, percent | 0.7 | 0.8 | 0.9 | 0.7 |

Example 8

A series of processes were carried out at 300° C. and atmospheric pressure, as described in Example 1A using silica gel and hydrogen chloride as the catalyst. The total feed composition (mole fractions) was as follows:

Isobutene _____ 0.640
Formaldehyde _____ 0.080
HCl _____ 0.004
Water+methanol (in aqueous formalin used as feed) _____ 0.276

The contact time (calculated from the volume of reactants at reaction temperature) was varied from 0.5 to 2.0 seconds in separate processes, with results shown in Table 8, all figures being for the fifth hour on stream of the catalyst.

TABLE 8

| Run No | A | B | C |
|---|---|---|---|
| Contact time, secs | 0.5 | 1.0 | 2.0 |
| Formaldehyde conversion, percent | 35 | 49 | 64.5 |
| Isoprene formation efficiency, percent (based on formaldehyde consumed) | 78.5 | 78.5 | 64.5 |
| Isoprene formation rate g./litre/hour | 230 | 160 | 90 |
| Methylbutenes content of isoprene, percent | 0.4 | 0.5 | 0.7 |

Example 9

Using the feed composition of the process of Example 7 a series of processes were carried out in which the reaction temperature was varied, the contact time being 1.0 second and the pressure atmospheric. Results are summarized in Table 9, figures again referring to the fifth hour on stream.

TABLE 9

| Run No | A | B | C |
|---|---|---|---|
| Reaction temperature | 250 | 300 | 350 |
| Formaldehyde conversion, percent | 60 | 49 | 40 |
| Isoprene formation efficiency, percent (based on formaldehyde consumed) | 53 | 78.5 | 72 |
| Isoprene formation rate g./litre/hour | 135 | 160 | 120 |
| Methylbutenes content of isoprene product | 0.5 | 0.5 | 0.8 |

Example 10

A series of processes were carried out at 300° C. and atmospheric pressure as described in Example 1A, with a total feed containing 0.64 and 0.08 mole fractions of isobutene and formaldehyde respectively. The mole fraction of HCl fed was varied, with results shown in Table 10, all figures again relating to the fifth hour of operation. The contact time was 1.0 second for all the tests.

TABLE 10

| Run No | A | B | C |
|---|---|---|---|
| HCl mole fraction | 0.0027 | 0.004 | 0.011 |
| Formaldehyde conversion, percent | 35 | 49 | 61 |
| Isoprene formation efficiency, percent (based on formaldehyde consumed) | 81 | 78.5 | 77 |
| Isoprene formation rate g./litre/hour | 117 | 160 | 200 |
| Methylbutenes content of isoprene product | 0.2 | 0.5 | 0.3 |

We claim:

1. The process for the production of isoprene from isobutene and formaldehyde which comprises reacting the isobutene and formaldehyde at an elevated temperature between about 100° and 400° C. in the vapor phase in the presence of a catalyst consisting of the vapor of a hydrogen halide of the group hydrogen chloride, hydrogen bromide and hydrogen iodide and silca gel as solid contact material.

2. The process for the production of isoprene from isobutene and formaldehyde which comprises reacting the isobutene and formaldehyde at an elevated temperature between about 100° and 400° C. in the vapor phase in the presence of hydrogen chloride vapor as catalyst and silica gel as solid contact material.

3. The process for the production of isoprene from isobutene and formaldehyde which comprises reacting the isobutene and formaldehyde at an elevated temperature between about 100° and 400° C. in the vapor phase in the presence, as catalyst, of the vapor of hydrogen chloride in the proportion of between 0.01 and 10% by weight based on the isobutene starting material and silica gel as solid contact material.

4. The process for the production of isoprene from isobutene and formaldehyde which comprises reacting the isobutene and formaldehyde at an elevated temperature between about 250° and 350° C. in the vapor phase in the presence of hydrogen chloride vapor as catalyst and silica gel as solid contact material.

5. The process for the production of isoprene from isobutene and formaldehyde which comprises reacting the isobutene and formaldehyde at an elevated temperature between about 250° and 350° C. in the vapor phase in the presence of hydrogen chloride vapor as catalyst and silica gel as solid contact material, and passing the reactants over the catalyst at a space velocity between 0.1 and 50 mols of aldehyde per litre of catalyst per hour.

References Cited in the file of this patent

UNITED STATES PATENTS

| | | |
|---|---|---|
| 2,218,640 | Friedrichsen et al. | Oct. 22, 1940 |
| 2,350,485 | Arundale et al. | June 6, 1944 |
| 2,391,667 | Amos et al. | Dec. 25, 1945 |
| 2,412,762 | Workman | Dec. 17, 1946 |